United States Patent [19]
Bateson et al.

[11] Patent Number: 4,923,125
[45] Date of Patent: May 8, 1990

[54] PROCESS FOR TREATING CONTAMINATED SOIL

[75] Inventors: George F. Bateson, Roseville; Dennis D. Chilcote, Hibbing; Michael M. Martinson, Mound; Steven B. Valine, Carver; Adolfo R. Zambrano, Hibbing, all of Minn.

[73] Assignee: BioTrol, Inc., Chaska, Minn.

[21] Appl. No.: 388,748

[22] Filed: Aug. 2, 1989

Related U.S. Application Data

[63] Continuation of Ser. No. 153,240, Feb. 8, 1988, abandoned.

[51] Int. Cl.$^5$ .............................................. B02C 23/18
[52] U.S. Cl. ...................................... 241/20; 241/21; 241/24; 299/7; 209/164
[58] Field of Search ..................... 299/7; 209/164–167; 210/221.2; 241/20, 21, 24, 79.1, DIG. 10

[56] References Cited

U.S. PATENT DOCUMENTS

| | | |
|---|---|---|
| 2,876,863 | 3/1959 | Kivari . |
| 4,288,319 | 9/1981 | Heijs et al. . |
| 4,336,136 | 6/1982 | Giguere . |
| 4,360,402 | 11/1983 | Ortner et al. . |
| 4,431,847 | 2/1984 | Bossier et al. . |
| 4,447,541 | 5/1984 | Peterson . |
| 4,464,266 | 8/1984 | Strehler et al. . |
| 4,514,305 | 4/1985 | Filby . |
| 4,518,502 | 5/1985 | Burns et al. . |
| 4,700,638 | 10/1987 | Przewalski ............. 241/DIG. 10 X |

FOREIGN PATENT DOCUMENTS

| | | |
|---|---|---|
| 1223373 | 6/1987 | Canada . |
| 0178009 | 4/1986 | European Pat. Off. . |
| 0185831 | 7/1986 | European Pat. Off. . |
| 0251562 | 1/1988 | European Pat. Off. . |

OTHER PUBLICATIONS

"BioTrol Soils Treatment System", Technical Bulletin No. 88-2, Biotrol, Inc. publicly circulated Apr. 15, 1988.
J. Garnett et al., "Initial Testing of Pilot Scale Equipment for Soil Decontamination," Rockwell International (Golden, Colo.) (Oct. 1980).
"Wenco Data Sheet," Aug. 1, 1980.
"Development of Site Remediation Technologies in European Countries", T. J. Nunno et al., paper presented Dec. 2, 1988.
"Assessment of International Technologies for Superfund Applications", T. J. Nunno et al., EPA, Sep. 1988.
Project Summary, "Mobile System for Extracting Spilled Hazardous Materials from Excavated Soils", EPA, Dec. 1983.
"Flotation", prepared by William I. Watson.
"Flotation and Other Surface Separations", chapter sixteen.
"Soil Washing Technology", Haztech News, p. 18, Jan. 29, 1987.
"Groundwater Remediation Systems", Biotrol, Technical Bulletin No. 87-1.
"1+1 Flotation Cells", Wemco.
Spiral Classifiers, Denver.
Flotation Machines, Outokumpu.
Wemco Depurator 1+1 Flotation Machine, Wemco.
D-R Flotation Machines, Denver Bulletin No. F01-B278.

Primary Examiner—Mark Rosenbaum
Attorney, Agent, or Firm—Merchant, Gould, Smith, Edell, Welter & Schmidt

[57] ABSTRACT

A process for the purification of soil contaminated with organic material is provided. The preferred process generally involves superposed attrition and classification processes, which lead to removal and concentration of highly contaminated fractions. The process may also include a step of flotation whereby hydrophobic materials in the soil are released to an interface with air bubbles, and are floated to the top of a flotation cell. In preferred processes according to the present invention, soil to be treated is extracted from a contaminated site, and is broken into relatively small particles. These particles are preferably treated in attrition and classification steps, to remove fine, slow settling, contaminated materials such as wood and fine soil materials. The resulting isolated coarser materials are then treated by flotation for a final polishing step. The process is particularly well adapted for use in treating soils contaminated with oil and grease materials containing PCP therein, from wood treatment plants of the like.

22 Claims, 2 Drawing Sheets

PROCESS FOR TREATMENT CONTAMINATED SOIL

This is a continuation of application Ser. No. 07/153,240, filed Feb. 8, 1988, now abandoned.

FIELD OF THE INVENTION

The present invention relation to soil purification and in particular to the purification of soil materials contaminated with organics. A specific application of the present invention is for the treatment of soils contaminated with organic oils that contain pentachlorophenol (PCP). Such soils are typically found at dump sites from wood treatment plants.

BACKGROUND OF THE INVENTION

Waste materials from many industries comprise organic materials, often organic greases and oils. In some instances these waste oils include highly toxic chemicals therein. A well-known example is the waste materials from conventional wood treatment facilities.

At a typical wood treatment facility, wood is preserved by being soaked or dipped in a vent of oil that has a preservative therein. For example, a facility for the treatment of telephone poles, railroad ties, or the like, may use large vats that contain an oil having pentachlorophenol (PCP) dissolved therein. A typical treatment vat used for such processes contains an organic solution containing about five percent PCP.

Waste organics, often containing a substantial amount of PCP, have often been dumped into a pit area located near the treatment facility. While this is particularly disturbing with respect to current pollution control standards, it must be understood that such treatment facilities have operated for many decades with substantially little change in the overall soaking and/or treatment procedure. Thus, many sites exist which came into existence well before the more recently imposed pollution controls.

The pollution problem is exacerbated by the nature of the industry. Very often a treatment facility was established, short term, near a location where a substantial amount of wood was milled, or treated wood was needed. After sufficient operation to accommodate the "local" need, the facility was closed and sometimes moved to a different location. Thus a plurality of abandoned dump sites exist throughout the country.

Over a long period of time, the contaminated organic materials may be leached, by groundwater, out of the immediate dump area, contaminating a widespread area. Since the organics often include a substantial amount of highly toxic materials therein, this leaching poses a substantial health and environmental hazard.

It is noted that while the problem of pollution from organics in soils has been described with respect to a specific industry involving wood treatment, the problem exists with respect to a variety of industries that have similarly generated organic tastes dumped into pits or the like. The wood treatment industry merely provides a well-known and notorious example, and one which often involves particularly hazardous PCPs.

No satisfactory method of overall soil treatment and/or purification has been previously available. Generally treatment methods have involved either incineration alone, microbial treatment, or some combination thereof. These have not been completely satisfactory, in part for the reasons discussed below.

A frequently used conventional method of purification is incineration. For a typical incinceration process, a large incinerator is assembled near a contaminated site. Soil material is excavated from the site, in bulk, and is incinerated. The incineration process generally destroys much of the organic material, but it also results in a large volume of ash material, much of which is fused into hard cakes or blocks. This material, which may still be substantially contaminated, is typically then stored in a secure dump, leaving the excavated site open. After a particular site has been cleaned, the incinerator is typically disassembled and moved to a new location.

Incineration, on its own, has been a generally undesirable process. First it is energy inefficient, that is a large amount of energy is consumed in operating the incinerator at sufficient temperatures and for a sufficient length of time to lead to effective purification of the large volume of materials involved. Secondly, product gases and materials from the incineration may be a problem. Further, the large amount of contaminated ash formed creates a disposal problem.

A second method of purifying contaminated soil is through the use of microbial action. Generally, especially for the oil/PCP problem, microbial purifications have proved undesirable. While in the laboratory microbial action may be shown to capably detoxify material, in the field it is less efficacious. First, temperature, moisture and oxygen control may be essential, and difficult to achieve. Also, a wide variety of chemical concentrations may be found throughout a single dump site, and from site to site. Concentration variations generate unpredictability. Further, complete microbial detoxification of concentrated contaminants may take a fairly long period of time, and during that period of time further leaching from the dump site may occur. Finally, soil variations and dump site environment variations pose substantial hurdles to the effective, predictable, action of microbes.

What has been needed has been an effective method of purifying soil that has been contaminated with organic material or the like. Generally, to be effective the method must not only accomplish the desired result, i.e. substantially clean soil, but it also should be relatively cost effective. That is, what has been needed has been a cost effective method to replace, provide an alternative to, or at least operate effectively in conjunction with, conventional soil treatment processes.

OBJECTS OF THE INVENTION

Therefore, the objects of the present invention are: to provide a method for the purifying treatment of soils that have been contaminated with organic materials; to provide such a method especially suited for application to the treatment of soils at dump sites from wood treatment facilities; to provide such a method suitable for the purification of soil materials contaminated with oils containing PCP therein; to provide a preferred such method which involves the utilization and preferably the superposition of attrition an classification processes to yield substantial removal of contaminating organic materials from solid soil particles; to provide a preferred such method which further involves a step of flotation separation to further remove contaminated organic material from association with soil material; to provide such a method which yields a concentrated waste material for disposal via conventional processes; and, to provide such a process: which is particularly flexible for use in association with a variety of sites; which is relatively simple to effect; which is comparatively cost effective; and, which is particularly well adapted for the proposed applications thereof.

Other objects and advantages of this invention will become apparent from the following descriptions, taken in connection with the accompanying drawings, wherein are set forth by way of illustration and example certain embodiments of this invention.

SUMMARY OF THE INVENTION

The present invention concerns the utilization of attrition and classification processes to yield cleansing of contaminated soil, to remove contaminating organics such as PCP-contaminating oils therefrom. An attrition process is a scrubbing step. Generally in an attrition process a slurry containing a high percent of solids is subjected to high intensity agitation. During such a process a high number of particle/particle contacts occur. This tends to break up the particles, which may be weakly agglomerated due to the contaminating organics. The particle/particle interactions also help scrub particle surfaces free of the organics.

A classification process is a particle size separation. Typical classification processes include: size separations based on relative settling velocities in a fluid, such as water; filtration; and, screening. Preferred classification processes for use in applications of the present invention are those in which separation is based on relative settling velocities. These include: centrifugation; flocculation; cycloning; and use of spiral or screw classifiers. Separations with spiral or screw classifiers are particularly advantageous, at least because: they are effective, relatively inexpensive and easy to effect; and, they can be operated on relatively large scales, even with conventional equipment.

When, according to the present invention, a classification process is practiced on a soil-containing slurry which has been subjected to an attrition process, substantial soil purification is achieved. In general, what is preferred is that the classification process is superposed on the attrition process. That is, the classification process is preferably initiated before particles have had a chance to completely settle from the attrition step. In this manner, separation is efficiently conducted. In particular, it has been found that when this is practiced in a system wherein the classification is of the type involving relative settling velocities, removal of a fraction containing slower settling materials during the classification procedure leads to substantial removal of contaminating organics. That is, during attrition a slow settling (typically fine, low density, high surface area) fraction containing relatively fine particles and which contains a substantial fraction of the contaminating organics is generated; and, classification conveniently removes and isolates the more highly contamined fraction. This leaves the faster settling particles considerably purified of, or separated from, contaminating organics.

It is noted that in some instances, attrition and separation can be completely separated in time. However, generally superposition is preferred.

Even further purification of the soils (fast settling fraction from classification) may, according to the present invention, be accomplished using flotation. Flotation is, in general, a process involving separation of materials based on relative hydrophobic tendencies. Flotation techniques are generally known, for other purposes, in various industries, including the mining industry and the pulp industry. They have also been utilized to accomplish liquid separations. It is a feature of certain embodiments of the present invention that flotation techniques have been found to be adaptable to the removal of organic contaminants from association with soil, in an efficient and economic purification process. As a result, final contaminant concentration in a large fraction of the soil can be reduced to a relatively low level, and the contaminating organics can be collected and concentrated for disposal.

A typical overall soil treatment process according to the present invention can be visualized as broken into several stages. In a first stage, the soil is excavated from a contaminated site and it is appropriately screened or otherwise treated for the removal of bulk contaminating items, such as large pieces of wood, metal objects or the like. Also during this stage the soil material may be sized to a particular, preferred, size for further operation.

The preferred second stage involves the practice of superposed attrition and classification processes as previously described. This leads to an isolation, concentration, and removal for disposal, of a fraction containing small, fine, relatively contaminated soil particles and a substantial amount of organics. For example, small wood chips which may include a substantial fraction of the contaminating organics, can be removed at this stage. Also certain relatively fine soil components, for example, fine clay and silicate materials, may include a substantial percentage of contaminating organics thereon. These can also be isolated and separated at this stage. An advantage to the overall process of the present invention is that wood materials, fine soil particles, or the like, which may be relatively substantially contaminated with organic substances, or which may be difficult to isolate from an organic fraction, are readily concentrated and isolated during Stage Two, and may be treated by follow-up incineration, if desired, in an efficient manner. That is, they can be transported rather easily, and they are relatively small in volume by comparison to the total bulk of soil at the site. The result is a relatively small volume of final incinerator ash product, which can be readily handled.

In a third stage, for certain embodiments, the soil material is treated via flotation, for the removal of substantial amounts of remaining contaminating organic materials from association with the soil. The flotation process generally involves agitation of the soil as a slurry or suspension, with bubbles of air passing therethrough. Hydrophobic contaminants, i.e. the typical organic oil/PCP comtaminants for example, generally migrate preferentially to the interface with the air bubbles, from the soil surface and/or aqueous suspension. Thus, via flotation the organic materials may be bumped, rubbed or drawn off the soil and into the interface with the bubbles. Also, fine particles having a substantial amount of organics adsorbed or absorbed thereon, and from which scrubbing of organics may be difficult, will also tend to migrate to the interface with the bubbles. Further, liquid organics will tend to migrate toward the bubbles. These materials are then floated to the top of the flotation system, wherefrom they can be overflowed or skimmed. The contaminants may be readily concentrated and disposed of in a conventional manner, for example by incineration.

In final steps, the cleansed soil may be returned to the pit area, or elsewhere, as desired. At this point overall contamination is relatively low, however further treatment can be undertaken if desired. For example, further washings, flotations, etc. can be used. Also, microbial action may be readily utilized at this point, if desired.

The present invention, as will be understood from the detailed descriptions, typically involves use of large amounts of water. Water, for example, is used as a carrier throughout the process, is used to form slurries during attrition and classification, and is also found in the skimmed material from the flotation process. This water becomes substantially contaminated with the contaminating organic materials removed from the soil. It is an advantage of the present invention that a substantial amount of recirculation of contaminated or potentially contaminated water may be provided. It is also envisioned that effective operation of processes according to the present invention will typically involve cooperation with water treatment processes for substantial purification of the water used, allowing for recycling of water and/or discharge to secondary water treatment systems.

The drawings constitute a part of this specification and include exemplary embodiments of the present invention, while illustrating various objects and features thereof.

DETAILED DESCRIPTION OF THE PREFERRED EMBODIMENT

Figure 1:
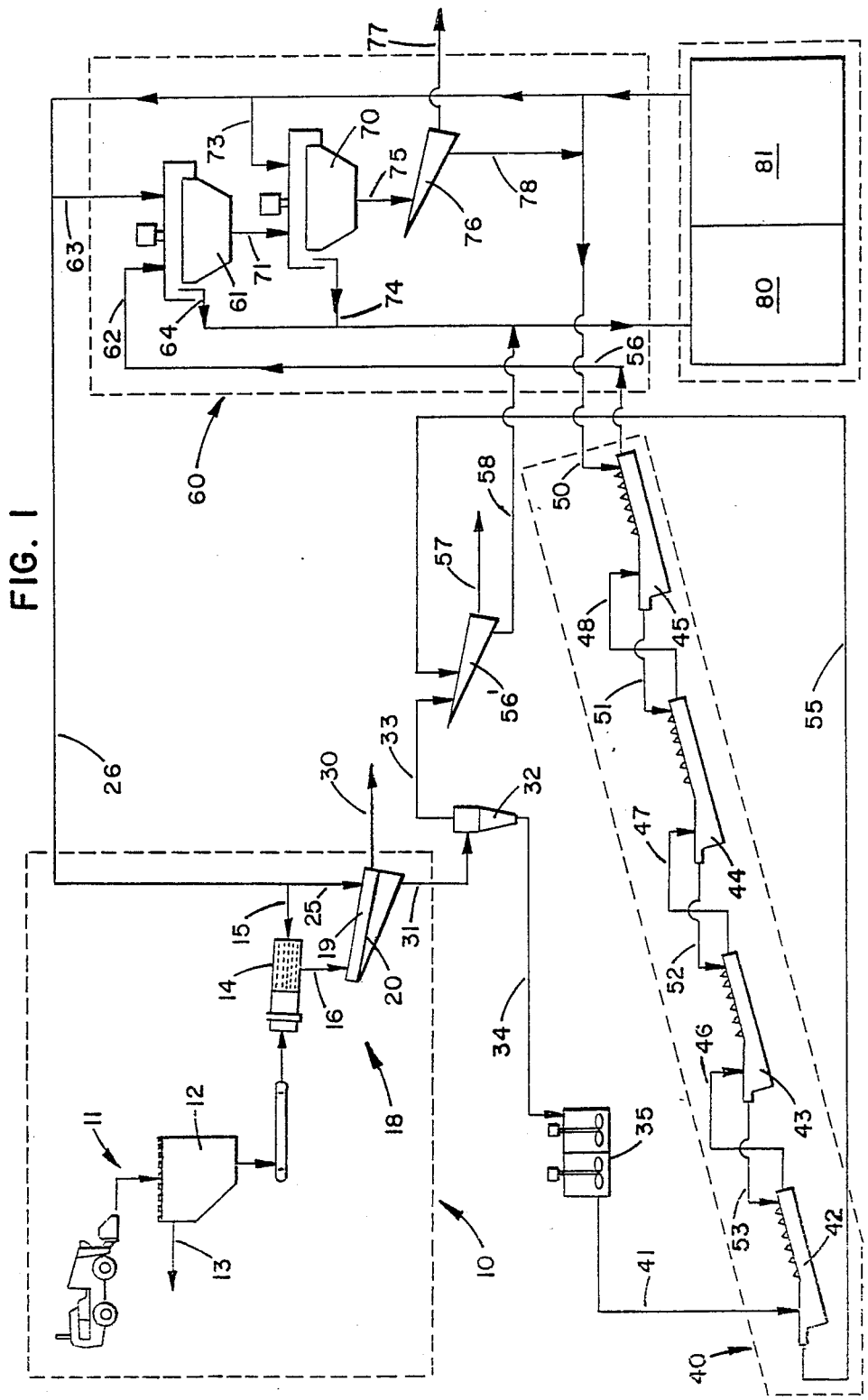
FIG. 1 is a schematic representation of an overall system for the treatment of soil according to the present invention.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but rather as a basis for the claims and as a representative basis for teaching one skilled in the art to variously employ the present invention in virtually any appropriately detailed system.

STAGE 1

Initial, Rough, Screening and Separation

As previously indicated, the present invention is described herein for applications involving the treatment of soil and materials found at dump sites from wood treatment facilities. It will be understood, however, that the principles of the present invention are generally applicable to soils and similar materials contaminated with a variety of organics from a variety of processes. Thus the specific treatment described herein is to be considered exemplary only.

In the first stage of the operation, excavated material from the dump site is physically treated so that it can be readily handled during the later purification washes and other steps. That is, any large unmanageable materials such as large rocks, tree stumps, scrap metal or the like are removed. Typically, to accomplish this, the soil material is physically removed from the dump site, and is passed through a screening device, such as a grizzly. In this apparatus the bulk contaminating materials such as pole butts, large wood blocks, or the like are removed from the soil. One reason why such a pretreatment of the soil is often desirable is that in many instances organic dump sites are also used as dump sites for waste items such as old tires, unusable pieces of wood, machinery parts or the like.

Typically soil material which passes through the grizzly includes a large amount of chunk or agglomerated material, i.e. material stuck together in large clumps or clods. While concentrations may vary considerably, from a typical waste dump this soil material typically includes a pentachlorophenol (PCP) concentration of about 100 to 2000 parts per million. This substantial concentration often results from a concentration of oil and grease in the soil of about 0.1 to 1.0 percent by weight. The oil and grease may actually be adsorbed upon certain components of the soil, or it may simply be trapped in the clumps, or it may simply be associated with certain fractions in the soil from which separation is difficult. The PCP, on the other hand, is typically found merely absorbed, or dissolved, in the oil materials. That is, it is often not directly adsorbed onto the soil itself. Thus, removal of the oils or greases along with those components of the soil either having a disproportionate amount of oil or grease therein or from which separation of the oils or greases is difficult, leads to substantial removal of the highly toxic contaminant (PCP).

The soil material at this point of the process typically contains several basic components. First, it generally contains substantial amounts of small wood pieces. It is found that these wood pieces usually include a relatively and disproportionately high concentration, often on the order of 1500 to 2000 parts per million, of contaminating PCP therein. The precise physical nature of this contamination is not known, however it will be readily understood that it is desirable to selectively remove this wood component. A substantial portion of the wood component is removable during a first stage pre-treatment process in several manners.

First, the soil material from the grizzly is conveyed into a conventional trommel or mill to substantially break up the clumps of dirt materials. In the trommel, the material is sprayed with water, to facilitate the breaking-up process and the removal of undesired components. A typical, conventional, trommel application with a water spray yields material sized to no greater than about one-half inch.

The slurry or sludge from the trommel is then preferably passed or discharged onto a screen system, to further size the material downwardly. Generally a screening of 10-65 mesh is desirable. Multiple screening steps may be used. For example, a first screening to about 10 mesh, and a second screening to about 20 mesh, to preferably size the soil material to no greater than about 20 mesh, is generally effective. Further water may be added to facilitate the filtering process.

In a typical operation, the total amount of water added during both the trommel and mesh screening processes is such as to result in about 10-60% solids, by weight, and preferably less than 50% solids. The split between water addition in the trommel and during screening may be as necessary to facilitate the two processes. It will be understood that a variety of amounts of water may be used, the above merely generally representing operable figures.

A substantial amount of wood material, which is not substantially broken-up during processing in the trommel and washing through the 10 and 20 mesh filters, is removed at the mesh screening stage. This concentrated wood material can be collected and readily incinerated, or otherwise treated for disposal. It is a particular advantage to the present invention that small pieces of contaminating wood, with organic contaminants absorbed therein, are readily concentrated, for disposal treatment via processes such as incineration. That is, the present invention concerns isolation, into a relatively small volume, of those materials or fractions which contain a high amount or concentration of contaminating organics. These may be relatively efficiently incinerated.

FIG. 1 is a schematic representation of a process according to the present invention. Although the following descriptions focus on the movement of soil materials, it is noted that the scheme depicted includes an advantageous system of water flow, making efficient use of contaminated water. Referring to FIG. 1, the reference numeral 10 generally designates stage 1 of the process. Reference numeral 11 illustrates a step of loading contaminated soil into grizzly 12, for initial separation. Large contaminants, such as pole butts and the like, are removed at 13. The material which passes through the grizzly 12, is conveyed into a trommel 14 and is broken therein. Reference numeral 15 generally designates flow of water into the trommel, to provide for production of a slurry. The slurry flow out of the trommel is designated by reference numeral 16. This material is directed toward a screening system 18, preferably comprising a 10 mesh screen 19 and a 20 mesh screen 20. The slurry material is directed through the screen system 18, with aid of water provided as indicated at reference numeral 25. It is noted that fluid feeds 15 and 25 may be provided from a single source 26, with conventional valves or the like controlling relative distribution of fluid into the trommel 14 and the filter system 18. Large materials such as wood chips or the like removed from the filter system 18 are shown taken-off at reference numeral 30. The soil material which passes through the screen system 18, sized to 20 mesh or smaller, is generally indicated at takeoff 31.

STAGE 2

The Attrition and Classification Processes

The material removed from a physical screen such as system 18 may still be substantially clumped or agglomerated. At this point a typical soil material generally comprises numerous components including: still smaller pieces of wood material; clay components; silica sand; and, natural organic matter such as decomposing plant material or the like. Due in part to the presence of the oils and greases in the contaminants, this soil material may still be clumped into relatively hard globules, preventing release of contaminants from between trapped inner particles. In a preferred application of the present invention the slurry of this material is concentrated substantially, in a cyclone or the like, to about 40–70% solids, or more, and is then broken up and scrubbed in an attrition step, such as in a pebble mill, attrition cell, or the like. During attrition, the slurry of solids is subjected to intense agitation. This suspends the solid particles, and causes a great deal of particle/particle bumping. The bumping breaks up the agglomerates, resulting in suspended particles of a variety of sizes. Some of the contaminating organics are rubbed off of the particles, and float in the water.

It has been found that a fine particle soil component, which for some soils is a relatively small percentage component by weight or volume, is sometimes associated with a substantial and disproportionate percentage of the contaminating oil and grease, with PCP therein, by comparison to the coarser components (typically the major component) of the soil. While it is not intended that this invention be limited to any particular theory, it may be theorized that this phenomenon may be due in part to the fact that fine particles present relatively large surface areas on which organics can readily adsorb. It may also be that relative difficulty of separation of fine particles from nonadsorbed organics is in part responsible for the observation. In any event, generally separation of fine particles, with any non-adsorbed organics associated therewith, results in substantial purification of remaining materials.

It is a feature of preferred embodiments of the present invention that a classification step is practiced after attrition, but before substantial settling, i.e., it is superposed on the attrition step. This is not required for the achievement of some advantages, but it does generate a more efficient separation. During classification, advantage is taken of the fact that larger, low (relative) surface area particles settle faster than very fine (relatively high surface area) particles. In general, the very fine particles (for example, clay) formed during attrition and which either have much of the organics adsorbed thereon, or in association therewith, are separated by classification, resulting in separation and removal of a substantial percentage of contaminating organics.

The material from the attrition scrubber or pebble mill is directed, for example, into a classification system. Preferably a classification system relying on relative settling velocities is used, such as a countercurrent screw classifier, or a plurality of countercurrent screw classifiers in series, with a washing water flow directed against movement of the sludge or soil. The washing water removes: relatively small, slow settling, particles of wood; small, slow settling, particles of soil such as clay having substantial amounts of contaminant thereon; and/or, floating organics. The contaminants removed by washing can be collected, concentrated and treated via incineration or the like. It is an advantage of the present invention, again, that those components of the soil which are not as readily purified of, or isolated from, contaminating organics, but which generally comprise a substantially small volume of the soil, are separated and concentrated, so that they may be treated via conventional incineration techniques in an efficient and effective manner.

It will be recognized that conventional screw classifiers may be utilized during this step. A variety of washing water flow rates may be utilized, depending on the system to which the process is applied. Generally, a percentage range of solids in the screw classifier(s) of about 10–50% is effective. For a typical purification, material entering the first screw classifier includes about 100–200 parts per million pentachlorophenol. In most applications, the classification is applied until reduction of organic contaminant has reached a readily achievable minimum, typically about 10 ppm. An advantage to the present invention is that for specific operations stages can be varied, in order to achieve an overall most efficient, or at least substantially efficient, operation.

The sludge material from a typical countercurrent screw classifier step, according to the present invention, includes about 75% soil, by weight, the remainder being substantially water. At this point, the soil generally comprises primarily silica sand with some oil or grease thereon, much of the wood component having already been removed as well as a substantial portion of the fine clay or silica component and any flotable natural organic components. In some instances, some of these materials will still be present, however, and further cleansing with respect to them may be accomplished in a third stage treatment.

Referring to FIG. 1, underflow from the screen system 18 is shown directed into cyclone 32. Overflow liquid is removed via line 33, and the concentrated sludge is transported via line 34 to attrition equipment such as a pebble mill 35. After sufficient, or desired, breaking up of the sludge material, and before substantial settling occurs, the finer product is transported to classification system 40 via line 41.

For the preferred embodiment described and shown, the classification system 40 comprises a plurality of classifiers arranged in series, with a countercurrent wash flow. More specifically, conventional screw classifiers 42, 43, 44 and 45 are shown arranged in series. As the sludge material is transported along these classifiers via lines 46, 47, and 48, a countercurrent flushing or washing water flow, to generally remove wood, natural organics, and slow settling, fine materials such as clay occurs via flow lines 50, 51, 52 and 53, respectively. The contaminated wash material is removed from the system via line 55. The washed, coarser fraction, typically primarily a silica sand component, is removed from the system via line 56, whereby it is transported into Stage 3.

Referring to the schematic of FIG. 1, it will be understood that the wash flow from the classifiers, through line 55, may be directed through screen 56', to lead to concentration of solid materials which can be removed via line 57 for incineration. Contaminated water released from the filter system 56', via line 58, may be directed into Stage 3 for use.

STAGE 3

Separation of Organic Material from Soil Components by Flotation

Flotation processes are known in the mineral industry and the pulp treatment industry; see for example, *Froth Flotation - 50th Anniversary Volume*, Ed. by Fuerstenau, D.W., American Institute of Mining, Metallurgical, and Petroleum Engineers, Inc., New York, 1962; *Flotation*, Volumes I and II, Ed. by Fuerstenau, M.C., American Institute of Mining, Metallurgical, and Petroleum Engineers, Inc., New York, 1976; *Chemical Engineer's Handbook*, 5th Ed.; Ed. by Perry, Robert F., McGraw-Hill Book Co.; New York 1973, pp. 21-65 to 21-69; Wills, B.A.; *Mineral Processing Technology*, Pergamon Press, Oxford, 1979, pp. 276-337; and, Zimmerman, R. E. and Son, S.C., "Part 3: Froth Flotation", *Coal Preparation*, 45th Ed., Ed. by Leonard, J. W., American Institute of Mining, Metallurgical, and Petroleum Engineers, Inc., New York 1979; the disclosures of which are incorporated herein by reference. Flotation may be provided in a variety of machines. Generally, flotation process machines are separated into two basic categories, mechanical flotation machines and pneumatic flotation machines. Within each category are two types, those operated as a single tank, and those operated as a bank of tanks (or cells) in series. Virtually any flotation system may be optionally utilized in association with the present process, however generally preferred processes will involve the use of a mechanical flotation device, either alone or in series with other such devices. It is noted that final flotation steps (polishing steps) may not be required in some purification schemes.

The primary function of a flotation separation in an application according to the present invention is to allow hydrophobic contaminants to contact and adhere to air bubbles. The air bubbles rise to the top of the flotation device, carrying the hydrophobic material with them. This generally results in formation of a contaminated froth at the top of the solution, which can be overflowed, skimmed or otherwise removed. As a result, the solid material contained within the flotation tank or cell is substantially purged of the hydrophobic material.

A unique application of flotation technology is involved in preferred applications of the present invention. In particular, the process involves the removal of organic contaminants from soil, and separation of soil particles not readily disassociated from organics, from the remainder of the soil. The organic components, including the greases, oils and any dissolved PCP or other toxic organics, are typically very hydrophobic and thus susceptible to removal via the flotation process. Generally, what is required is that the machine maintain the soil particles in suspension and further that the system generate sufficient dispersion of air bubbles throughout the solution, with collision of air bubbles with particles, to ensure high frequency of contact between the air bubbles and the particles for substantial transport of hydrophobic organic material to the air bubble surface.

Generally, a concentration of about 10-40% solids, by weight, in the flotation step is effective. Preferably high solids concentration, and/or intense agitation, are avoided so that little attrition (particle/particle collision) occurs. A reason for this is that attrition would tend to pull bubbles off of floated particles, thus allowing less time for transport of organics to the bubbles.

A variety of manufactures of flotation equipment can be utilized in association with processes according to the present invention. These include, for example, flotation machines developed for other uses, operated with appropriate stirring velocity and air bubble flow. Such devices include systems which generate air bubbles by a simple draw of air from the atmosphere, and also those which utilize separate blowers or pressurized air sources. Usable flotation machines or cells are available, for example, from the Denver Equipment Division, Joy Manufacturing Company, Colorado Springs, Colorado 80901; Outokumpu Oy, Espoo 20, Finland; and, Wemco, Sacramento, California 95852. Such devices are generally developed for use in the mining industry, however they can be readily adapted to application according to the present invention.

Referring to FIG. 1, Stage 3, i.e, the flotation stage, is generally indicated at reference numeral 60.

Once pretreatment at Stage 2 has rendered a sufficiently purified soil material, the soil material is transferred into a flotation cell 61, as for example along flow path 62. As indicated previously, when, for example, a series of screw classifiers is used to wash and transfer sufficiently ground up or otherwise sized particles of soil, from a typical pole treatment dump the washed material comprises about 85-95% soil by weight, and contains 5-20 ppm PCP. The material is directed into a flotation cell 61, along with a sufficient amount of water via line 63 for cell operation. Agitation is started, and is maintained at a rate appropriate to inhibit any substantial settling of material, i.e., a sufficiently high rate to maintain substantially all particles in suspension. Air bubbles are formed in the flotation cell, during operation. These air bubbles, typically numerous micro bubbles, may be formed by an atmospheric draw, or through the provision of a blower or source of pressurized air or the like. Generally sufficient bubble formation is created to ensure effective flotation of the organic material from the soil material, for effective purification. The organic material trapped in the air bubble froth is floated to the top of the machine, wherefrom it can be removed by overflow or by use of conventional mechanical skimmers or the like, along path 64. Similarly, any fine soil particles having organics adsorbed thereon will also tend to float the froth.

For Stage 3, reference numeral 60, shown in FIG. 1, a second flotation cell 70 is shown used in series with the first cell 61 to achieve a high degree of cleansing. The underflow from cell 61 is directed to cell 70 along flow path 71. Water, for froth formation, is directed into cell 70 via line 73. The overflow or froth is removed at 74, and the underflow, or purified soil, at 75. The clean soil is separated from the water at 76, and is removed at 77. The carrier water is removed at 78, and may be cycled into backwash for Stage 2.

In the preferred embodiment shown, froth, from 64 and 74, is concentrated while the water removed therefrom is directed into a water purification system 80. The purified water may be stored in reservoir 81, and used throughout the process.

Figure 2:
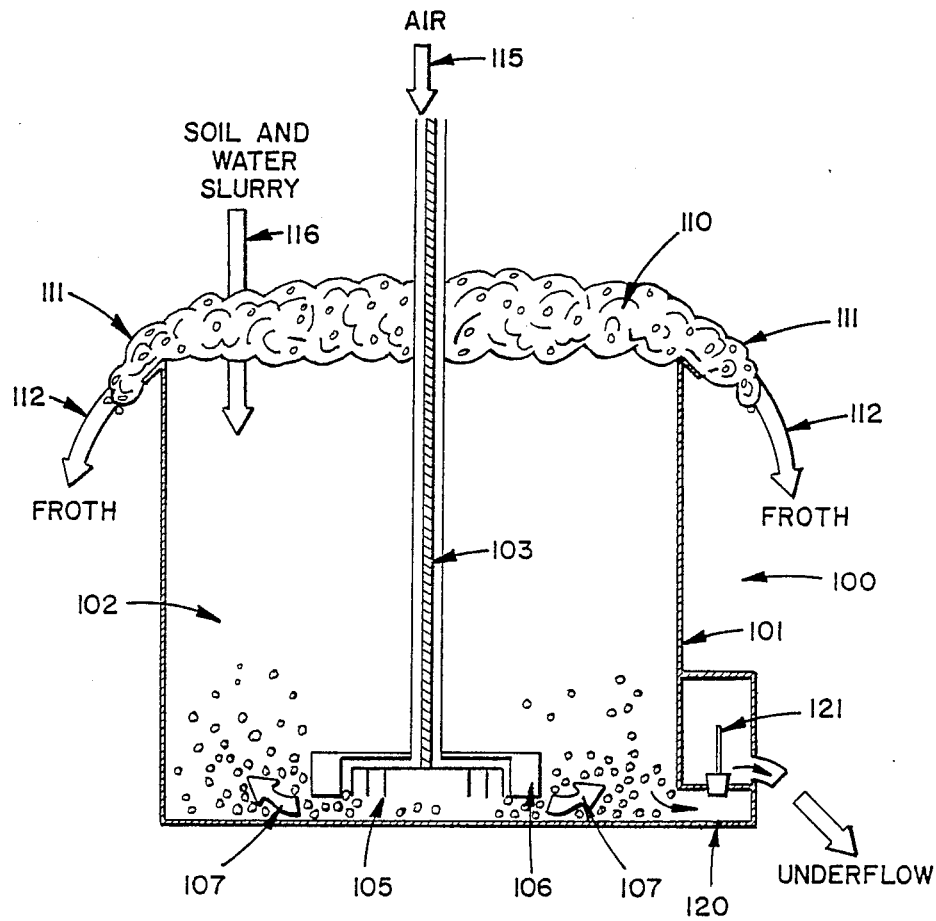
FIG. 2 is a schematic representation of a flotation device for treating soil according to a step of the present invention.

In FIG. 2, a typical flotation cell for use in a system according to the present invention is schematically depicted. In FIG. 2, the cell is generally designated at reference numeral 100. The cell 100 includes a tank portion 101 into which water and contaminated soil, typically as a slurry, are dumped for treatment. The sludge or slurry 102 within tank 101 is rapidly agitated by an agitator/aerator 103. The particular agitator 103 shown includes a plurality of vanes 105 thereon which rapidly rotate to churn the water, and keep the solid soil material from settling in the bottom of the tank. Air bubbles are formed in a high sheer zone between the agitation cones 105 and the stator, with air flow being generally represented by arrows 107. As the bubbles disperse throughout the slurry or sludge 102, soil particles are encountered, organics transfer to the interface with the air bubble, and the organics float to the top of the tank in the form of froth 110. The froth is then removed via skimming or overflow 111, as indicated at reference numeral 112. The three components which are mixed in the tank (air, soil and water) are represented as being introduced via lines 115 and 116, respectively. Underflow is shown removable via the port 120, operated by valve 121.

It will be understood that FIG. 2 is intended to be schematic only, and that a variety of specific mechanical structural arrangements can be utilized.

In systems according to the present invention, agitation speed, air bubble size and concentration, water concentration, and retention time in the tank may be varied to achieve an optimum, or at least a desired level of efficiency and purification. It is noted that the flotation cell may be operated on a closed, batch, cycle, or with a continuous run therethrough. Generally, a continuous system will provide for a more efficient overall operating system.

Referring again to FIG. 1, underflow from the flotation system is generally designated at reference numeral 75. This material includes the purified soil, generally containing less than 10 ppm PCP, and preferably 5 ppm PCP or less. At this relatively low concentration, the PCP may pose substantially little problem. If desired, in some applications of the present invention this soil can be dried and transferred back to the pit area with an active microbial agent therein, to obtain even further purification. It is noted that at this relatively low PCP concentration, microbial action may be more effectively undertaken and controlled.

The skimmed or overflow material from the flotation cell can be concentrated, if desired, and incinerated. The water, somewhat contaminated, can be directed to a water treatment facility or the like.

Frothers may be added during flotation. Frothers generally change the surface tension of the water in a manner facilitating formation of a stable froth phase. Frothers include methyl amyl alcohol and pine oil. They may typically be used in an amount of about 0.01–0.2 lbs. frother/ton of soil in the flotation device.

pH Control; Surfactants; Temperature Control

The general process has been described in the absence of specific adjustments in pH, and without the use of added surfactants. Generally, for many soil treatment processes according to the invention, effective removal of organic contaminants can be obtained without special pH adjustments or surfactant use. Should it be deemed necessary, a pH adjustment can be made at almost any stage. Also surfactants can be introduced at various stages to facilitate removal of the organic material from the solid particles. The process is generally effective at ambient temperatures, but may be practiced over a wide variety of temperatures. In some instances temperature control may be used to facilitate certain steps.

Mobile Testing Facility

The previously described process is very flexible. That is, it can be implemented using fairly conventional process equipment, when the equipment is organized for operation in the unconventional manner described. The particular equipment to be used may vary depending on the specific nature of the soil being treated, and the specific nature of the contaminant contained therein. As soil composition and particle size ranges and contaminant concentration and nature vary, individual specifics of the treatment may be changed accordingly. For example, in some systems no flotation step may be necessary. In other systems, a single flotation cell may be all that is needed to accommodate efficient purification, whereas in still other systems a plurality of cells in series may be required.

Generally, it will be preferred to evaluate a particular site to be treated, in advance of setting up a full scale treatment facility, in order to determine what specific equipment will be necessary. To accomplish this, a mobile, reduced scale, facility may be provided, utilizing appropriately mounted equipment arranged to conduct a process according to the present invention on a small scale. Via such an arrangement, an evaluation of the soil, and the process for purifying the soil, can be made. In this manner, a most efficient utilization of a flotation process in association with other steps of purification, can be determined.

Operation of the present process will be further understood by reference to the following experiments and examples.

EXPERIMENT 1

Characterization of Soil Contaminated with PCP

For the following experiment, contaminated soil collected from the dump site of a pole treatment plant was utilized. The two major impurities of concern were pentachlorophenol (PCP) and the grease/oil component. The soil sample contained a substantial amount of wood therein. Originally the soil, classified to less than one-half inch, contained about 18% water. The overall PCP concentration in the sample was about 250 ppm. The sample contained a variety of sizes of particulates and could be sized accordingly. It was generally found that the PCP concentration varied throughout the size range of the particles, being higher in size fractions coarser than 20 mesh and finer than 150 mesh, as shown in Table 1. The data suggested that a two-step process of coarse screening and fine screening or classification may significantly clean the bulk of the soil by removing a small fraction of the original material that is highly concentrated with PCP. Wood concentration in the soil sample was found to be about 5–10% by weight, with the bulk of the wood being contained in larger chunks or pieces. The grease/oil concentration was generally about 40–80 times greater than that of the PCP concentration.

TABLE 1

Typical Distribution of Pentachlorophenol in Soil

| Screen Size | Sample Weight Grams | Wt. % | PCP Concentration ppm |
|---|---|---|---|
| 3M | 13.4 | 1.33 | 301 |
| 6M | 62.6 | 6.23 | 424 |
| 10M | 29.6 | 2.95 | 715 |
| 20M | 302.8 | 30.14 | 310 |
| 35M | 186.2 | 18.53 | 222 |
| 65M | 204.4 | 20.34 | 124 |
| 100M | 114.7 | 11.42 | 120 |
| 150M | 49.2 | 4.90 | 141 |
| −150M | 41.9 | 4.16 | 504 |
| | 1004.8 | 100.00% | |

EXPERIMENT 2

Dry and Wet Screening

This separation step was undertaken to eliminate handling difficulties created by the wood content of the soil and to confirm PCP distribution in the soil. The process involved screening to minus 10 or 20 mesh to remove the bulk of the coarse wood, and is described above as occurring in Stage 1.

The test soil was subjected to both dry and wet screening. The dry screening was merely a cursory test to remove the bulk of the coarse wood. For the dry screening, the soil sample was first dried at 75° Centigrade to at least 16 hours. The dry soil was then screened through a 10 mesh screen, using a manually shaken, frame-mounted screen. The plus 10 mesh and minus 10 mesh fractions were analyzed for PCP. The dry screened material showed a significant and disproportionate accumulation of PCP in the plus 10 mesh fraction, which was determined to contain a significant amount of wood. The results of this screening are reported below in Table 2.

TABLE 2

Assay of Fractions from Dry Screening

| Fractions | Weight (g) | Weight (%) | ppm PCP |
|---|---|---|---|
| +10 mesh | 3,450 | 10.4 | 547.5 |
| −10 mesh | 29,800 | 89.6 | 328.3 |

For the wet screening, a weight of tap water equal to the weight to be screened was poured into a large tub. Portions of the soil were placed on a framemounted 10 mesh screen, which was shaken while partially submerged. The +10 mesh fraction that remained on the screen was then washed with as little water as possible, and collected. The process was repeated until all of the soil sample was screened. The +10 mesh portion was dried and sampled for analysis of PCP. A second sample of this dried +10 mesh product was screened into five separate size fractions. Typical assays of fractions derived from screening the +10 mesh product are listed in Table 3.

TABLE 3

Assay of Fractions Derived from the +10 Mesh Portion Obtained by Wet Screening

| Fraction Size (Mesh) | ppm PCP |
|---|---|
| +3M | 856 |
| +6M | 503 |
| +10M | 472 |
| +20M | 481 |
| −20M | 464 |

The −10 mesh slurry in the tub was allowed to settle for 72 hours and the aqueous phase or supernatant (first wash) was siphoned off and collected. This wash was analyzed as a slurry (solids plus solution) but was also filtered to determine the weight of solids remaining in suspension. The settled solids were reslurried with an equal weight of water and were allowed to settle for 15 minutes. The supernatant (second wash) was again siphoned, collected, and analyzed. The reslurrying step was repeated two more times for a total of four washes. A dark slime layer (slimes) that settled on the top of the sandy soil was left until the last siphoning operation when it was removed, dried, weighed and analyzed. After the slime layer was removed, the final settled solids were collected, dried, weighed and analyzed (−10 mesh). Typical assays of the products from the washing cycles are reported in Table 4.

TABLE 4

Wet Screening and Washing of Soil

| Products | Fluid (liters) | Dry Solids (grams) | Percent Solids | Stream Assays ppm PCP |
|---|---|---|---|---|
| +10M | | 2,280 | 6.9 | 556.4 |
| −10M | | 27,250 | 83.5 | 135.2 |
| slimes | | 50 | 0.16 | 567.8 |
| 1st wash | 24.85* | 12.4 | 0.04 | 13.8 |
| 2nd wash | 22.40 | 2,266.9 | 6.9 | 159.0 |
| 3rd wash | 16.90 | 811.2 | 2.5 | 63.0 |
| 4th wash | 1.00 | 0 | | 10.0 |
| Totals | | 32,640.5 | 100.0 | |
| Calculated Head | | | | 304.6 |

*This particular slurry was allowed to settle for 72 hours before siphoning off the supernatant. Thus, this wash contained very few solids.

From these results it was determined that wet screening significantly reduced the PCP content of the −10 mesh portion of the soil. A large percentage of the PCP was found in the washes, where it was in solution and also associated with a suspension of wood and clay material. In addition, it was determined that wet screening is also an effective means to separate a relatively soil-free wood fraction (the +10 mesh stream) containing high PCP values. The wood fraction can then be readily incinerated.

EXPERIMENT 3

Flotation

The slurry from the wet screening operation cannot be readily filtered due to the presence of oil and fine particles. The slimes contain a suspension of finely divided soil, small pieces of wood, and oil. Methods for the cleaning of this suspension include flotation, centrifugation, settling, and combinations thereof. Certain of these processes may be undertaken in Stage 2, discussed above, and include treatment in an attrition scrubber or pebble mill to further break up agglomerates and scrub particle surfaces before processing this slurry in a classifier to wash out fine or floatable contaminated material. As a result of such operations, products containing relatively concentrated amounts of PCP and oil/grease components can be isolated for disposal. In particular, fine clay particles and small wood pieces are removed by this process.

Preferably, the soil material is ultimately treated via flotation to achieve reduction of PCP concentration, or concentration of other contaminants, to a minimum, or at least to below a desired value. This is a particularly effective way of obtaining a relatively clean silica sand material.

An initial evaluation of flotation with pretreatment (washing) was made on a slurry derived from wet screening soil at 10 mesh. Slurry from a screening operation was agitated in a flotation cell at 1200 rpm. The solids content of the slurry was about 10.6%. The slurry was subjected to flotation for 15 minutes without frother addition. The cell overflow and underflow were sampled and assayed. Results are shown in Table 5.

TABLE 5

| Flotation of a −10 Mesh Slurry from Wet Screening | | | | |
|---|---|---|---|---|
| Product | Fluid (liters) | Solids (grams) | Product Assay ppm PCP | PCP Split % |
| froth | 2.0 | 102.0 | 117.5 | 32.5 |
| underflow | 4.0 | 300.0 | 122.2 | 67.5 |

The results from this experiment indicate that flotation on material pretreated by a single washing step generates a large overflow (froth) stream with no concentration of contaminants and handling difficulties comparable to the feed material. However, the underflow, containing three-fourths of the solids, responds well to settling. A conclusion is that it is not necessarily practical to have flotation at the front end of the process flowsheet, as it does not effectively resolve the problem of slimes handling on its own. Rather, generally what is preferred, prior to flotation, is a sequential washing system to reduce the slurry handling problem by further reducing contaminant content. This may be accomplished through the utilization of methods as described above, for Stage 2 operations. Alternatively, flotation can be used advantageously at the head of the flowsheet to separate intractable slimes; i.e. the fines containing a substantial amount of organics not amenable to scrubbing, for additional processing in a centrifuge or the like.

EXPERIMENT 4

Scrubbing

In a designed experimental program requiring 30 tests, the effect of scrubbing on the removal of PCP from soil was investigated as a function of temperature, time, pH, and concentration of surfactant. For this experimental design, temperature ranged from 25°–65° Centigrade, time ranges from 10–15 minutes, pH ranged from 5–11, and the concentration of surfactant ranged from 0.1–0.5 lbs./short ton of soil.

Soil contaminated with PCP was wet screened at 10 mesh to remove coarse wood. The −10 mesh fraction of the soil was slurried with water at a pulp density of 50% solids. The pulp was brought to the desired temperature, pH was adjusted, and surfactant was added. The slurry was scrubbed (intensely agitated) in a baffled vessel using a shrouded impeller rotating at 1000 rpm. The pH was maintained constant throughout the duration of the test. At the end of the scrubbing period the slurry was allowed to settle for 5 minutes and the aqueous phase or supernatant was siphoned off and collected. The remaining settled solids were reslurried to 50% solids using fresh water, agitated for 15 seconds, and allowed to settle for 5 minutes before siphoning off the supernatant. The combined siphoned fluids containing a suspension of fine particles was screened at 48 mesh to remove wood fibers. The settled solids were filtered and the filtrate was combined with the siphoned fluids to make up the final fluid suspension. The filtered solids and the +48 mesh wood fraction were dried overnight at 75° Centigrade and pulverized to −100 mesh. Samples of soil, fluid, and wood were assayed for PCP.

Statistical analysis of the results showed that the level of PCP remaining in the soil is a linear function of pH and time. The least significant factor was surfactant concentration regardless of whether the surfactant was anionic, cationic, or anionic-nonionic. The most significant factor was pH. Percent removal (PR) of PCP from soil could be approximated by the following equation:

$$PR = 39.89 - 0.187 \times (minutes) = 1.96 x (pH)$$

EXPERIMENT 5

Washing Scrubbed Soils Using Classifiers

Following a flotation test such as that described in Experiment 3, the solids remaining in the flotation apparatus exhibited a well-defined settling pattern after the impeller stopped rotating. Invariably, a black layer of slowly settling wood and soil formed on top of the more rapidly settling sand material. It was presumed that a classifier could be used to remove the lighter component, which was concluded to be rather heavily contaminated with PCP.

A 3.5 inch by 2.5 foot screw classifier with a capability for bed washing by means of bottom-bed water injection was used for this testwork. The feed to the classifier was the −10 mesh fraction from a sample of screened soil contaminated with PCP. This sample was slurried to 50% solids with tap water and scrubbed in a mixing tank for one hour under intense agitation. The slurry was fed to the classifier and the sand discharge and fluid overflow (first overflow) were collected. The fluid overflow was allowed to settle and the dark layer of slimes that settled out on top of the fine sand was selectively removed and analyzed separately (slimes).

The remaining fluid overflow (first overflow) was analyzed as a slurry but also filtered to determined the weight of solids remaining in this suspension. The sand bed in the classifier was removed (first bed), dried weighed, and analyzed. A sample of the first sand discharge (first product) was taken for analysis. The remaining first sand discharge was slurried with tap water and fed back into the empty classifier to produce a second overflow and second sand discharge. The sand product from the classifier was sample for analysis (second product) and recycled two more times without removing the bed to simulate cleaning of the sand in a multi-stage system. Experimental results are presented in Table 6.

TABLE 6

Cleaning −10 Mesh Soil in a Screw Classifier

| Stream | Fluids (liters) | Solids (grams) | PCP Assays ppm PCP | PCP split % |
|---|---|---|---|---|
| Feed | | 20,000 | 105.5 | |
| Products | | | | |
| 1st Overflow | 182 | 1,456 | 8.1 | 67.7 |
| Slimes | | 2,365 | 194.5 | 21.2 |
| 2nd–4th Overflow | 200 | 400 | 0.1 | 0.9 |
| 1st Bed | | 3,630 | 31.2 | 5.2 |
| 1st Product | | 124 | 8.4 | |
| 2nd Product | | 122 | 7.2 | 0.2 |
| 3rd Product | | 126 | 7.5 | |
| Final Bed | | 2,000 | 8.0 | 0.7 |
| Final Product | | 10,831 | 8.1 | 4.1 |
| | | 21,056 | 103.1 | 100.0 |

The above data support the conclusion that a substantial amount of PCP removal can be accomplished through utilization of a classifier, prior to introduction of the soil material into a flotation cell or the like. However, at some point during recycling of classified sands, no further substantial PCP removal was observed. This suggests that the PCP remaining in the classifier sand product is locked in particles of size and density comparable to the sand particulates. Release of PCP from these particles could be facilitated through the use of a rigorous scrubbing stage or attrition stage prior to additional stages of classification, as illustrated in Experiment 6. Alternatively, the bulk of the remaining portion of the PCP and oil/grease material can be removed in a flotation cell, as illustrated in Experiment 7.

EXPERIMENT 6

Washing Soils Using Multi-Stage Classification with Interstage Scrubbing

This test, following the procedure established in Experiment 5, was designed to better simulate a bank of classifiers by removing the bed in the laboratory screw classifier prior to recycling the sand discharge product back into the same classifier to simulate the next stage. Also, interstage scrubbing was simulated by scrubbing the classifier sand discharge product in a flotation cell at 2100 rpm. Thus, a −10 mesh soil sample contaminated with PCP was slurried with tap water to 50% solids, scrubbed in a flotation cell, and fed to the screw classifier. Classifier overflow (first slurry) and sand discharge were collected. The sand bed remaining the classifier (first bed) was removed, dried, weighed, and analyzed. A sample of sand discharge was taken for analysis (first sand) and the remaining sand product was slurried with tap water, subjected to attrition scrubbing in a flotation cell for 15 minutes at 2100 rpm, and fed back into the empty classifier for the second stage of washing. This cycle was repeated twice for a total of three stages of cleaning. Results are presented in Table 7. This data indicates that with proper intensity of interstage scrubbing the soil can be cleaned from 120 ppm PCP to approximately 5–10 ppm PCP in two to three stages.

TABLE 7

Cleaning Soil by Multistage Classification with Interstage Scrubbing

| Stream | Fluid (liters) | Solids (grams) | Stream Assay ppm PCP | PCP split % |
|---|---|---|---|---|
| Feed | | 12,000 | 120 | |
| Products | | | | |
| 1st Slurry | 83 | 916.3 | 14.9 | 86.1 |
| 1st Bed | | 2,080.0 | 49.6 | 7.2 |
| 1st Sand | | 65.2 | 8.2 | 0.0 |
| 2nd Slurry | 76 | 113.6 | 0.3 | 1.4 |
| 2nd Bed | | 2,155.0 | 12.8 | 1.9 |
| 2nd Sand | | 56.8 | 9.1 | 0.0 |
| Final Slurry | 45 | 22.7 | 0.2 | 0.6 |
| Final Bed | | 1,520.0 | 7.1 | 0.8 |
| Final Sand | | 4,550.0 | 6.3 | 2.0 |
| Calculated Feed Assay | | | 125.3 | |

EXPERIMENT 7

Soil Polishing by Flotation

As previously described, final removal of PCP from the soil, i.e., a polishing step, can be accomplished through flotation. This unique step leads to a final soil product which is very low in PCP, and which can be disposed of in manners not necessarily requiring special handling in dump sites.

A soil contaminated with PCP was processed through five stages of scrubbing at a pH of 9.5 to prepare a scrubbed soil slurry as feed for flotation tests. The slurry was adjusted to 33% solids and was floated for 5 minutes. It was then conditioned with 0.3 lbs. pine oil or MIBC/short ton of soil and floated for another 10 minutes. Additional tests were performed in which two stages of flotation were conducted by conditioning for 10 minutes with 0.1 lbs. pine oil/short ton of soil and pulling froth for 5 minutes. The combined froth products, underflow solids, and underflow filtrate were analyzed for PCP. Typical results are given in Table 8 below.

TABLE 8

Polishing Scrubbed Soil by Flotation

| Stream | Fluid (liters) | Solids (grams) | PCP ppm | PCP split % |
|---|---|---|---|---|
| Feed | | 500 | 9.2 | |
| Froth | 0.4 | 1.8 | 2.3 | 18.8 |
| Underflow | | | | |
| Solids | | 494.5 | 4.6 | 47.0 |
| Filtrate | 1.4 | | 1.2 | 34.2 |
| Calculated Feed Assay | | | 9.6 | |

From the above data, which were consistent for all tests, it can be concluded that the polishing operation may be used to reduce the PCP content of the final soil by as much as 50%. The solid material in the froth appeared to be mostly clay. The sand material was released in a relatively clean form. Results also indicated that it appears beneficial to operate at a basicity within the pH range of 7–8.

It is to be understood that while certain embodiments of the present invention have been illustrated and described, the invention is not to be limited to the specific steps, forms or arrangements herein described and shown, except as limited by the following claims.

What is claimed and desired to be secured by patent:

1. A process for treating soil contaminated with organic material; said process including the steps of:
   (a) extracting said soil from the environment and screening same to form a screen undersized material;
   (b) subjecting the screen undersized material to an attrition process to break the material into fine particles suspended in fluid;
   (c) conducting a classification process on the contaminated soil, for isolation and removal of a fraction containing relatively fine, slow setting, clay and natural organic particles from a fraction containing faster settling, coarser, soil particles on the basis of relative settling velocities; said step of classification being performed prior to complete settling of a suspension from said attrition step; and
   (d) conducting a flotation on fast settling material from step (c); said step of flotation including floating soil material in a flotation cell in the presence of microbubbles of air in sufficient concentration to encounter said scrubbed material and selectively partition hydrophobic materials including organics in said soil to an interface with said bubbles; whereby said organics are separated from said scrubbed material and are floated to an upper portion of said flotation cell.

2. The process to claim 1 wherein:
   (a) said step of classification involves passage of the screen undersized material into a classifier system with a backwash of water;
   (b) whereby a fraction containing small wood materials and relatively fine, contaminated, soil materials are selectively removed from said soil, said fraction containing wood and relatively fine, contaminated, soil materials generally including a disproportionate amount of contaminants therein.

3. The process according to claim 2 wherein:
   (a) said classifier system includes a plurality of screw classifiers arranged in series.

4. The process according to claim 2 wherein:
   (a) said flotation step comprises passage of said fast settling material through a plurality of flotation cells organized in series.

5. The process according to claim 2 wherein:
   (a) said soil is screened to less than about 10 mesh before said attrition step.

6. A process for treating soil contaminated with organic material; said process including the steps of:
   (a) excavating said soil and classifying same to remove bulk items therefrom by passage through a grizzly;
   (b) breaking said soil into smaller particles by means of a trommel;
   (c) screening said smaller particles to less than 10 mesh;
   (d) subjecting the minus 10 mesh material to an attrition process to break the material into particles suspended in fluid;
   (e) conducting a classification process on the contaminated soil, for isolation and removal of a fraction containing relatively fine. slow settling, clay and natural organic particles from a fraction containing faster settling, coarser, soil particles; and,
   (f) conducting a flotation step on faster settling material from step (e); said step of flotation including floating soil material in a flotation cell in the presence of microbubbles of air in sufficient concentration to encounter said scrubbed material and selectively partition hydrophobic materials including organics in said soil to an interface with said bubbles; whereby said organics are separated from said scrubbed material and are floated to an upper portion of said flotation cell.

7. A process according to claim 6 wherein:
   (a) said step of classification is performed prior to complete settling of a suspension from said attrition step.

8. A process for treating soil contaminated with organic materials; said process including the steps of:
   (a) conducting an attrition process on the contaminated soil, to break the soil into particles suspended in fluid; and
   (b) conducting a classification process on the contaminated soil, for isolation and removal of a fraction containing fine clay and natural organic particles from a fraction containing coarser soil particles.

9. A process according to claim 8 wherein said classification process comprises isolation of a contaminated fraction containing relatively fine, slow settling, particles from a fraction containing faster settling particles by means of relative settling velocities.

10. A process according to claim 9 wherein said step of classification is performed prior to complete settling of a suspension from said attrition step.

11. A process according to claim 10, wherein said step of attrition includes:
    (a) forming a slurry of less than 10 mesh soil material in water, the slurry containing 40–70% solids by weight; and,
    (b) passing said slurry through an attrition mill.

12. A process according to claim 10, wherein: (a) said step of classification, involves substantial removal of a relatively fine particle clay component from said soil, as part of the fraction containing slow settling particles.

13. A process according to claim 10, including a step of:
    (a) subjecting the fraction containing fastener settling particles to a flotation treatment involving floating particles of soil in a flotation cell in the presence of microbubbles of air in a sufficient concentration to encounter said particles and selectively partition hydrophobic materials including organics in said soil to an interface with said bubbles.

14. A process for treating soil contaminated with organic materials; said process including the steps of:
    (a) conducting an attrition process on the contaminated soil, to break the soil into particles suspended in fluid; and
    (b) conducting a classification process on the contaminated soil, for isolation and removal of fine, contaminant-carrying component from a fraction containing relatively contaminantfree, coarser, soil particles.

15. A process according to claim 14, wherein said step of classification is performed prior to complete settling of a suspension from said attrition step.

16. A process according to claim 15, wherein said step of attrition includes:
    (a) forming a slurry of less than 10 mesh soil material in water, the slurry containing 40–70% solids by weight; and, (b) passing said slurry through an attrition mill.

17. A process for treating soil contaminated with organic materials; said process including the steps of:
    (a) conducting an attrition process on the contaminated soil, to break the soil into particles suspended in fluid;
        (i) said attrition process including: forming a slurry of less than 10 mesh soil material in water, the slurry containing 40–70% solids by weight; and, passing said slurry through an attrition mill; and
    (b) prior to complete settling of a slurry resulting from attrition step (a), conducting a classification process on the contaminated soil, for isolation and removal of a fraction containing slower settling, relatively fine particles from a fraction containing coarser soil particles.

18. A process according to claim 17, wherein: p1 (a) said step of classification involves substantially removal of a relatively fine particle clay component from said soil, as part of the fraction containing slower settling particles.

19. A process according to claim 18, including a step of:
    (a) subjecting the fraction containing coarser particles to a flotation treatment involving floating particles of soil in a flotation cell in the presence of microbubbles of air in a sufficient concentration to encounter said particles and selectively partition hydrophobic materials including organics in said soil to an interface with said bubbles.

20. A process for treating soil contaminated with organic material; said process comprising the steps of:
    (a) screening soil from the environment to form a screen undersized material;
    (b) subjecting the screen undersized material to an attrition process to break the material into fine particles suspended in fluid;
    (c) conducting a classification process on the contaminated soil, prior to the complete settling of the slurry resulting from attrition step (b), said classification process for isolation and removal of fine, contaminantcarrying component from a fraction containing relatively contaminant-free, coarser, soil particles.

21. A process according to claim 20, further comprising a step of:
    (a) subjecting the fraction containing coarser particles to a flotation treatment involving floating particles of soil in a flotation cell in the presence of microbubbles of air in a sufficient concentration to encounter said particles and selectively partition hydrophobic materials including organics in said cell to an interface with said bubbles.

22. A process according to claim 20, wherein said attrition step includes:
    (a) forming a slurry of less than 10 mesh soil material in water, the slurry containing 40–70% solids by weight; and
    (b) passing said slurry through an attrition mill.

* * * * *